US008200940B1

United States Patent
Lindholm

(10) Patent No.: US 8,200,940 B1
(45) Date of Patent: Jun. 12, 2012

(54) REDUCTION OPERATIONS IN A SYNCHRONOUS PARALLEL THREAD PROCESSING SYSTEM WITH DISABLED EXECUTION THREADS

(75) Inventor: John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 981 days.

(21) Appl. No.: 12/164,492

(22) Filed: Jun. 30, 2008

(51) Int. Cl.
G06F 15/00 (2006.01)
G06F 15/76 (2006.01)
G06F 17/00 (2006.01)
G06T 1/00 (2006.01)

(52) U.S. Cl. ........... 712/22; 712/11; 712/220; 375/316; 345/418

(58) Field of Classification Search .................. None
See application file for complete search history.

(56) References Cited

U.S. PATENT DOCUMENTS

| | | | |
|---|---|---|---|
| 5,867,723 A * | 2/1999 | Chin et al. ................ | 712/11 |
| 7,535,070 B2 * | 5/2009 | Eshaghian-Wilner et al. .................. | 257/421 |
| 7,617,384 B1 * | 11/2009 | Coon et al. ................ | 712/220 |
| 2003/0021359 A1 * | 1/2003 | He ................................. | 375/316 |
| 2005/0151960 A1 * | 7/2005 | Gerwe et al. .................. | 356/121 |

OTHER PUBLICATIONS

Eggers, et al., "Simultaneous Multithreading: A Platform for Next-Generation Processors," *IEEE Micro*, vol. 17, No. 5, pp. 12-19, Sep./Oct. 1997.

* cited by examiner

*Primary Examiner* — Eddie P Chan
*Assistant Examiner* — William Partridge
(74) *Attorney, Agent, or Firm* — Patterson & Sheridan, LLP

(57) ABSTRACT

A system and method for successfully performing reduction operations in a multi-threaded SIMD (single-instruction multiple-data) system while one or more threads are disabled allows for the reduction operations to be performed without a performance penalty compared with performing the same operation with all of the threads enabled. The source data for each intermediate computation of the reduction operation is remapped by a configurable crossbar as needed to avoid using invalid data from the disabled threads. The remapping function is transparent to the user and enables correct execution of order invariant reduction operations and order dependent prefix-reduction operations.

20 Claims, 13 Drawing Sheets

REDUCTION OPERATIONS IN A SYNCHRONOUS PARALLEL THREAD PROCESSING SYSTEM WITH DISABLED EXECUTION THREADS

FIELD OF THE INVENTION

Embodiments of the present invention relate generally to reduction operations, and more specifically to performing reduction operations in a SIMT (single-instruction, multiple-thread) system with one or more execution threads disabled.

DESCRIPTION OF THE RELATED ART

Multi-threaded systems are configured to perform reduction operations for a group of threads in parallel, storing intermediate results during the operation. When one or more threads in the group are disabled during execution of a branch, jump, or other conditional function, the intermediate results are not valid and corrupt the results for other threads in the group.

Accordingly, what is needed in the art is a system and method for correctly performing reduction operations in a multi-threaded system while one or more threads are disabled.

SUMMARY OF THE INVENTION

A system and method for correctly performing reduction operations in a synchronous parallel thread processing system while one or more threads are disabled allows for the reduction operations to be performed without a performance penalty compared with performing the same operation with all of the threads enabled. The input values for each intermediate computation of the reduction operation are remapped as needed to avoid using invalid values from the disabled threads. The remapping function is transparent to the user and enables correct execution of order invariant reduction operations and order dependent prefix-reduction operations, such as sum to right.

Various embodiments of a method of the invention for performing a reduction operation in a multi-threaded computing device include receiving an active mask for a single-instruction, multiple-thread (SIMT) thread group, mapping an input lane value of a first thread to a first output lane value of the first thread to provide a first input for the reduction operation, and determining that the active mask indicates that execution of a second thread is disabled. When the input lane value for the active thread is available, an input lane value of an active thread in the SIMT thread group is mapped as a second output lane value for the first thread to replace an invalid value of the second thread to provide a second input for the reduction operation. Otherwise, the reduction operation is converted into a move operation for the first thread.

Various embodiments of the invention include a multi-threaded computing device configured to execute a reduction instruction. The multi-threaded computing device includes a crossbar controller that is coupled to a configurable crossbar. The crossbar controller is configured to receive an active mask for a single-instruction, multiple data (SIMT) thread group, map an input lane value of a first thread to a first output lane value of the first thread to provide a first input for the reduction operation, and determine that the active mask indicates that execution of a second thread is disabled. When the input lane value for the active thread is available, the crossbar controller maps an input lane value of an active thread in the SIMT thread group as a second output lane value for the first thread to replace an invalid value of the second thread to provide a second input for the reduction operation. Otherwise, the crossbar controller converts the reduction operation into a move operation for the first thread. The configurable crossbar is configured to route said input lane values to said output lane values for the SIMT thread group according to mappings provided by the crossbar controller.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
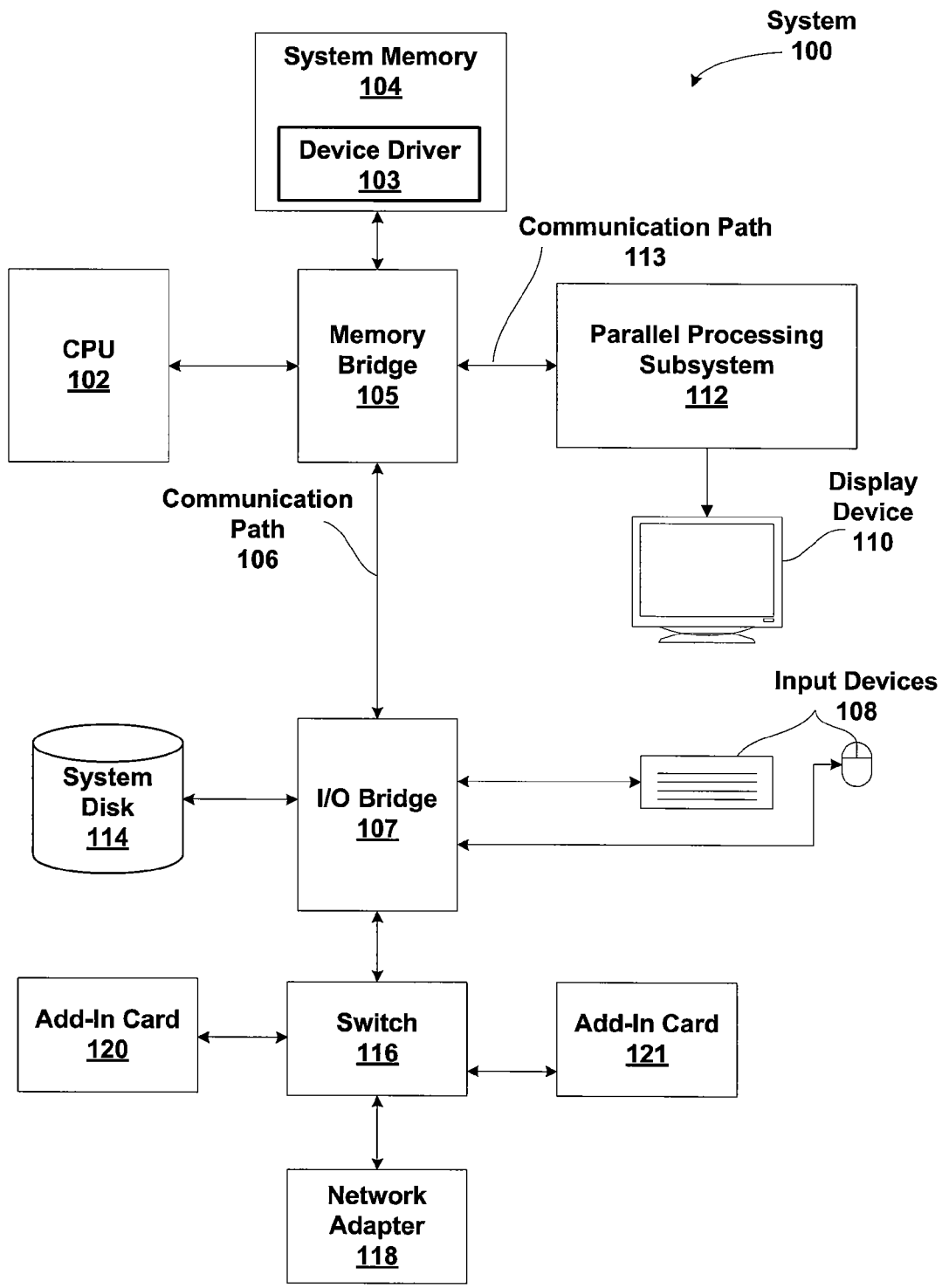
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional cathode ray tube (CRT) or liquid crystal display (LCD) based monitor).

A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
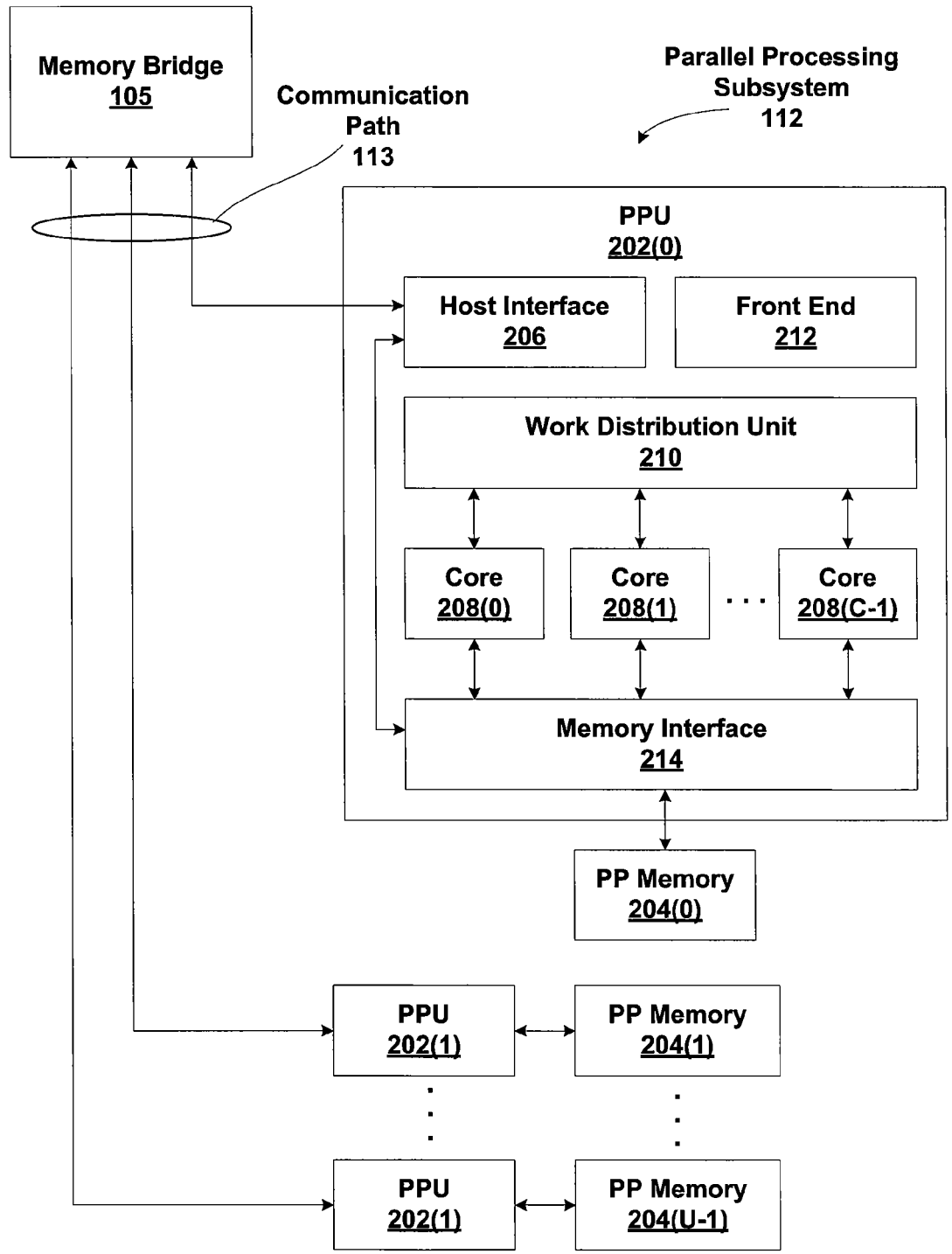
FIG. 2 is a block diagram of a parallel processing subsystem for the computer system of FIG. 1 in accordance with one or more aspects of the present invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≧1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU 202 may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU to system memory, e.g., via a bridge chip.

As noted above, any number of PPUs 202 can be included in a parallel processing subsystem. For instance, multiple PPUs 202 can be provided on a single add-in card, or multiple add-in cards can be connected to communication path 113, or one or more of the PPUs 202 could be integrated into a bridge chip. The PPUs in a multi-PPU system may be identical to or different from each other; for instance, different PPUs might have different numbers of cores, different amounts of local PP memory, and so on. Where multiple PPUs 202 are present, they may be operated in parallel to process data at higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and so on.

Core Overview

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In some embodiments, single-instruction, multiple-thread (SIMT) techniques are used to support parallel execution of a large number of generally synchronized threads, using a common instruction unit configured to issue instructions to a set of processing engines. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In a way similar to a SIMD machine, a SIMT parallel processing core 208 executes instances of a single parallel program on different data across a plurality of parallel processing engines 302 included in the core 208. Thus, for example, the core 208 may be configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "warp" or "thread group." Additionally, a plurality of related thread groups may be active (in different phases of execution) at the same time on a core 208. This collection of thread groups is referred to herein as a "cooperative thread array" ("CTA").

In one embodiment, each core 208 includes an array of P (e.g., 8, 16, etc.) parallel processing engines 302 configured to receive SIMT instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate synchronous parallel execution. A SIMT instruction may specify a register operand which accesses a register entry in each lane corresponding to each thread of a thread group. In some embodiments, each processing engine 302 can only access LRF entries in the lane assigned to it. The total number of entries in local register file 304 is advantageously large enough to support multiple concurrent threads per processing engine 302.

A crossbar unit 310 is coupled between local register file 304 and processing engines 302 to provide the input values to each processing engine 302, as described further herein. Crossbar unit 310 accesses a value for each lane, i.e., a value for each thread, and routes the values to processing engines 302, connecting varying lanes to provide inputs as needed to execute the instructions. Importantly, crossbar unit 301 dynamically configures crossbar unit 310 as needed based on an active mask that indicates which threads are disabled for each instruction. Data read from local register file 304 for a lane of a disabled thread is invalid and, if used during execution of a reduction operation may cause the output for one or more active threads to be invalid.

In some embodiments of the present invention, each processing engine 302 also has access to an on-chip shared memory 306 that is shared among all of the processing engines 302 in core 208 and may be used to transfer data between different threads. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache (s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multi-threaded and can execute up to some number G (e.g., 32) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency. Since each thread may correspond to a different context, multiple contexts may be processed over multiple cycles as different threads are issued for each cycle.

Instruction unit 312 is configured such that, for any given processing cycle, an instruction (INSTR) is issued to each P processing engines 302. Each processing engine 302 may receive a different instruction for any given processing cycle when multiple contexts are being processed simultaneously. When all P processing engines 302 process a single context, core 208 implements a P-way SIMD microarchitecture. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads for a single context or N*24 concurrent threads for each context, where N is the number of processing engines 302 allocated to the context.

On each clock cycle, an instruction that is issued to up to P*G threads making up a selected one of the SIMT thread groups. To indicate which threads are currently active, an "active mask" for the associated thread group may be included with the instruction. In some instances, some threads in a SIMT thread group may be temporarily idle, e.g., due to conditional or predicated instructions, divergence at branches in the program, or the like. Processing engines 302 use the active mask as a context identifier, e.g., to determine which portion of its assigned subunit in local register files 304 should be used when executing the instruction. Crossbar unit 310 uses the active mask to control the routing of values read from lanes of local register file 304 to thread inputs at processing engines 302. Thus, in a given cycle, all processing engines 302 in core 208 may be synchronously executing the same instruction for different threads in the same thread group. Those skilled in the art will recognize that such synchronous parallel execution of each thread in a thread group is characteristic of a SIMD architecture. When the threads in a thread group are executing synchronously, processing engines 302 are configured to execute instructions in a SIMD manner. However, in some instances, some threads in a thread group may be temporarily idle, e.g., due to conditional or predicated instructions, divergence at branches in the program, or the like, as described further herein. Processing engines 302 may be configured to function as SIMD or SIMT engines.

Operation of core 208 is advantageously controlled via a work distribution unit 200. In some embodiments, work distribution unit 200 receives pointers to data to be processed (e.g., primitive data, vertex data, and/or pixel data) as well as locations of pushbuffers containing data or instructions defining how the data is to be processed (e.g., what program is to be executed). Work distribution unit 210 can load data to be processed into shared memory 306 and parameters into parameter memory 308. Work distribution unit 210 also initializes each new context in instruction unit 312, then signals instruction unit 312 to begin executing the context. Instruction unit 312 reads instruction pushbuffers and executes the instructions to produce processed data. When execution of a context is completed, core 208 advantageously notifies work distribution unit 210. Work distribution unit 210 can then initiate other processes, e.g., to retrieve output data from shared memory 306 and/or to prepare core 208 for execution of additional contexts.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Persons skilled in the art will understand that the architecture described in FIGS. 1, 2 and 3 in no way limits the scope of the present invention and that the techniques taught herein may be implemented on any properly configured processing unit, including, without limitation, one or more CPUs, one or more multi-core CPUs, one or more GPUs, one or more multi-core GPUs, or the like, without departing the scope of the present invention.

Reduction Operations with Disabled Threads

PPU 202 may be configured to form a graphics processing pipeline with, one or more cores 208 configured to perform the functions of a vertex processing unit, geometry processing unit, and/or a fragment processing unit. Other graphics processing functions such as, primitive assembly, rasterization, and raster operations may also be performed by core 208 or may be performed by host interface 206. At any point during graphics processing, one or more threads may become inactive (disabled) prior to execution of a reduction operation, causing data in the lanes of the disabled threads to be invalid until the effected inactive thread is enabled. Similarly, when PPU 202 is configured to perform other processing, it is desirable to perform reduction operations while one or more threads are disabled.

Order invariant reduction operations, such as find minimum, find maximum, sum (fold), and the like, combine values across the lanes to produce a result. Other reduction operations, i.e., prefix reduction operations, such as a directional sum, also combine values across the lanes to produce a result. In order to produce a correct result, values in disabled thread lanes should be ignored. In order to prevent any disabled threads from corrupting the enabled threads, all of the threads can be enabled prior to execution of reduction commands and re-disabled immediately after execution of each reduction command. However, enabling and re-disabling thread execution for specific commands is cumbersome and may reduce the performance of the sychronous parallel thread processing system. Therefore, crossbar unit 310 is advantageously configured based on the active mask to ensure that invalid lane values are not selected as inputs for active threads during the execution of reduction operations. Reduction operations are performed correctly, regardless of whether or not any threads are disabled according to the active mask.

Figure 3A:
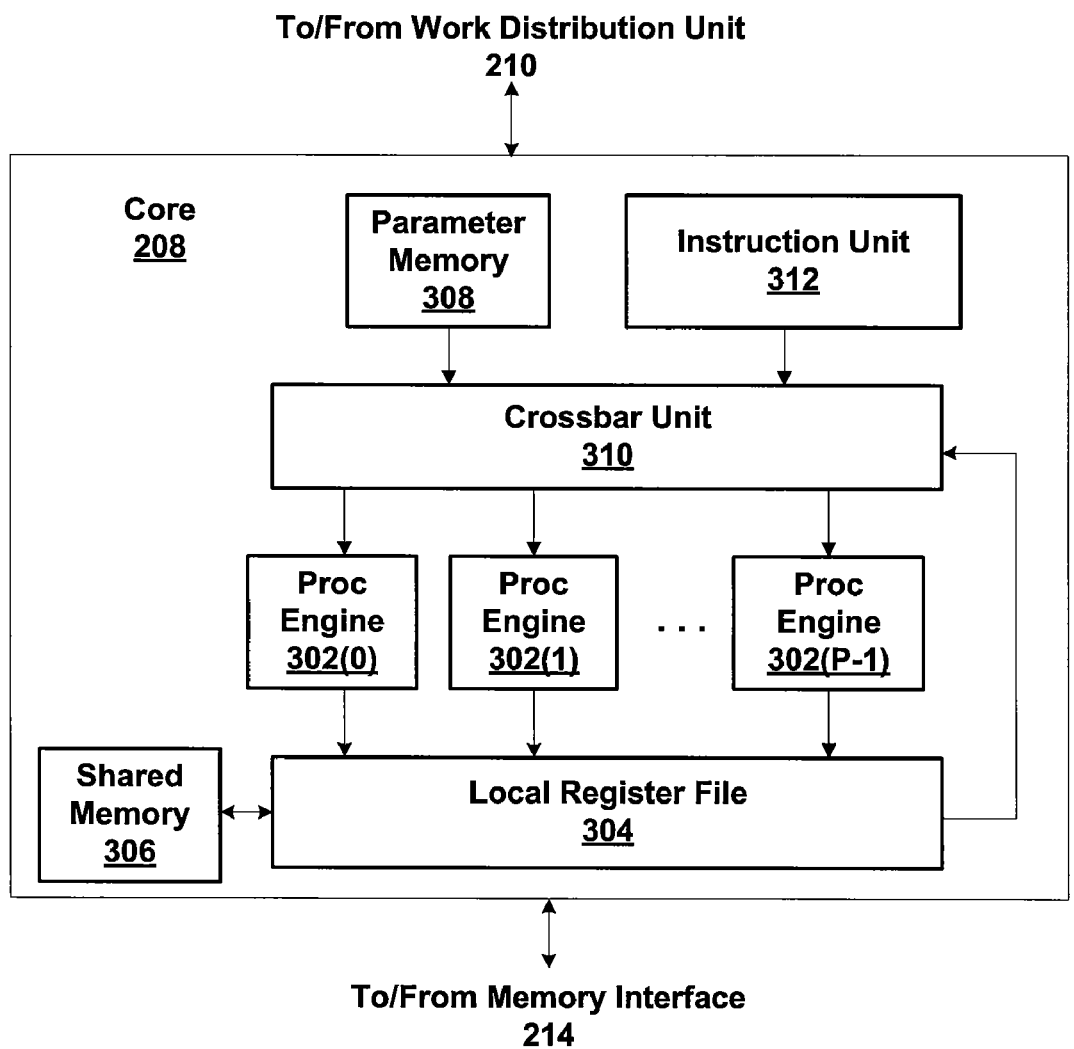
FIG. 3A is a block diagram of a core for the parallel processing subsystem of FIG. 2 in accordance with one or more aspects of the present invention.
Figure 3B:
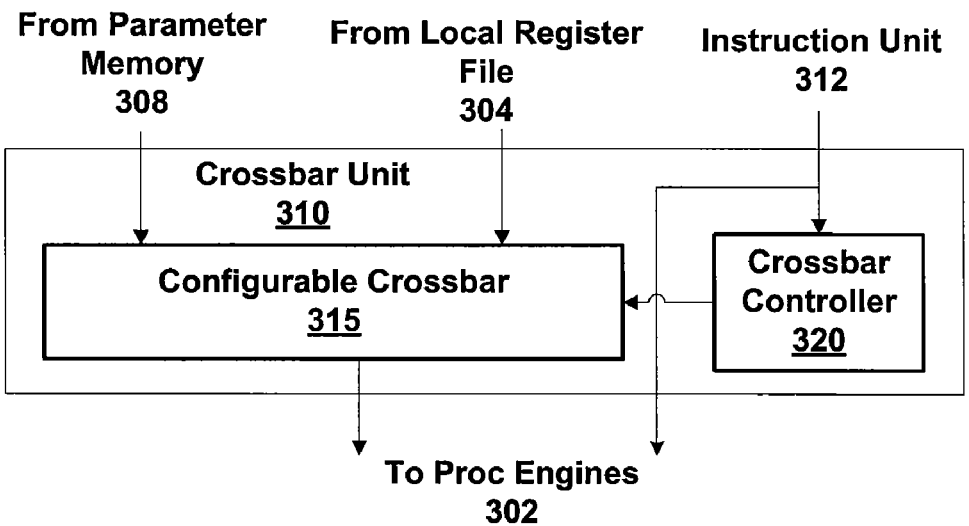
FIG. 3B is a block diagram of the crossbar unit shown in FIG. 3A in accordance with one or more aspects of the present invention.

FIG. 3B is a block diagram of crossbar unit 310 shown in FIG. 3A, in accordance with one or more aspects of the present invention. As described, crossbar unit 310 supports processing engines 302 for G=1. When processing engines 302 support G>1, a crossbar unit 310 may be used for each multithreaded processing engine 302 to provide input values from local register file 304. Alternatively, a crossbar unit 310 may be used for each instruction that is output by instruction unit 312 in a single clock cycle.

Crossbar unit 310 includes a configurable crossbar 315 and crossbar controller 320. Crossbar controller 320 configures the routing of lane values received from local register file 304 by configurable crossbar 315 to the outputs of configurable crossbar 315. The routing varies based on the instruction and the active mask (both provided by instruction unit 312) for the threads being processed. Processing engines 302 are configured to execute the instruction provided by instruction unit 312 (via crossbar unit 310).

Figure 3C:
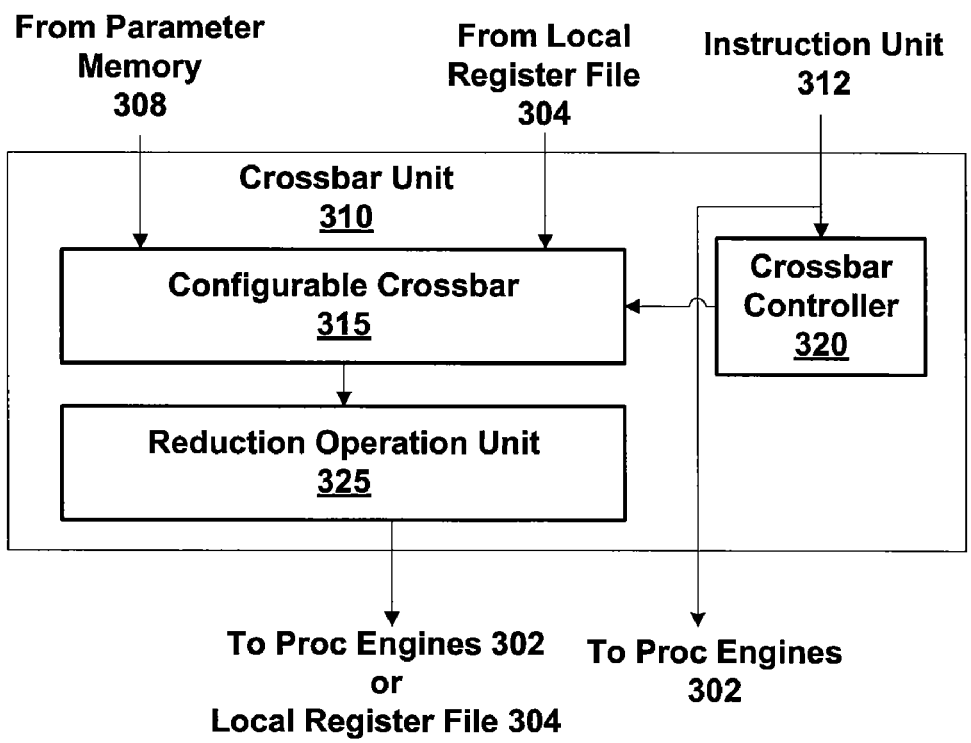
FIG. 3C is another block diagram of the crossbar unit shown in FIG. 3A in accordance with one or more aspects of the present invention.

In some embodiments of the present invention, processing engines 302 are configured to perform functions such as floating point arithmetic. In those embodiments, it may be more efficient to perform integer math used for reduction operations using simpler and more compact dedicated circuitry. FIG. 3C is another block diagram of crossbar unit 310 shown in FIG. 3A, in accordance with one or more aspects of the present invention. Crossbar unit 310 includes a reduction operation unit 325 that is configured to perform reduction operations and output the result to processing engines 302 or local register file 304. Reduction operations are sometimes performed by successively computing intermediate results that are stored in local register file 304. Therefore, the intermediate results may be directly output to local register file 304 instead of passing through processing engine 302.

Figure 4A:
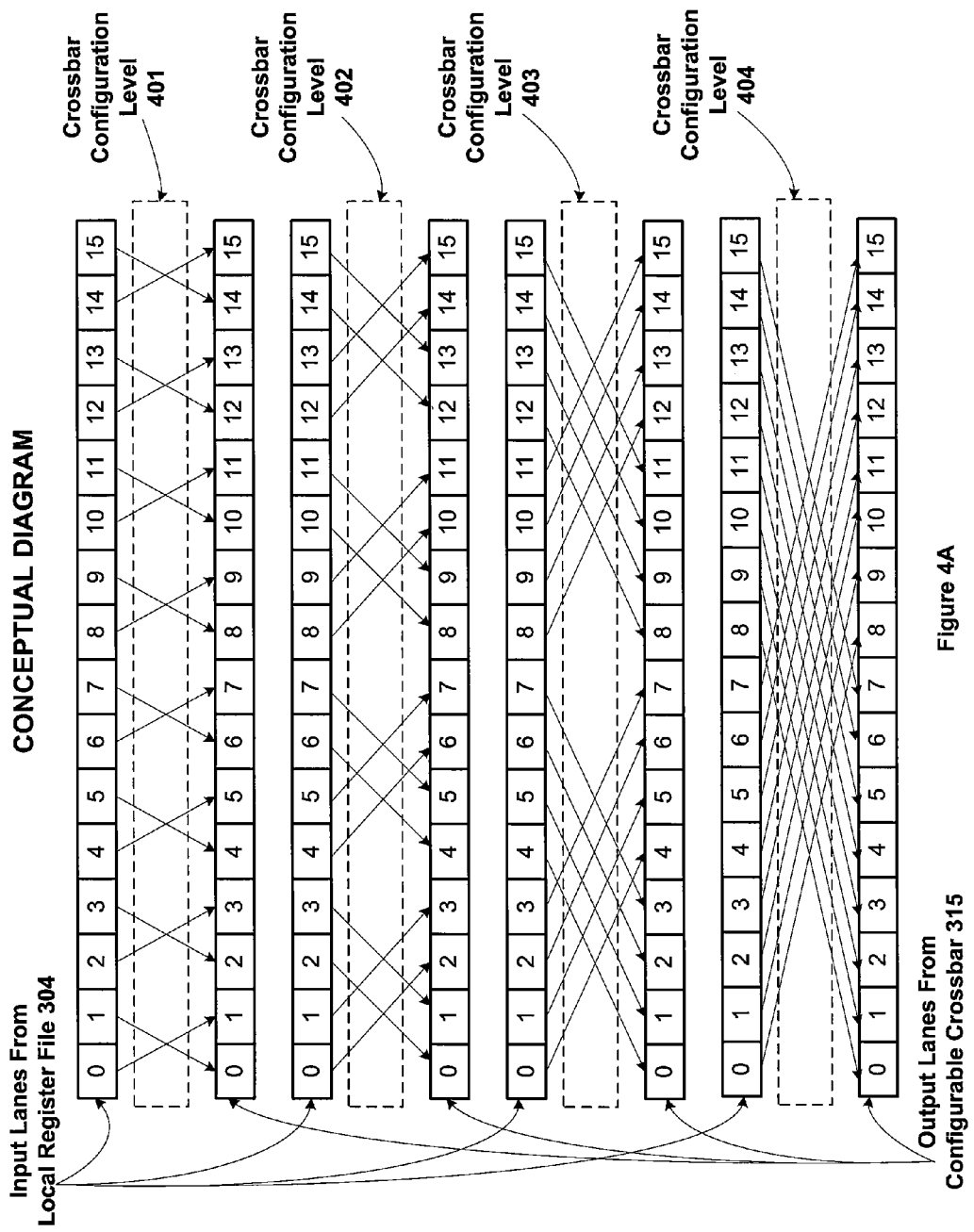
FIG. 4A is a conceptual diagram of a sequence of crossbar configurations used to perform a reduction operation in accordance with one or more aspects of the present invention.

FIG. 4A is a conceptual diagram of a sequence of crossbar configurations used to perform a reduction operation, in accordance with one or more aspects of the present invention. The sequence shown in FIG. 4A configures crossbar unit 310 to perform an order invariant reduction operation for 16 lanes of a thread group with 16 SIMD threads. When one or more threads are disabled according to the active mask, additional mappings are needed, as described in conjunction with FIGS. 4B, 4C, and 4D.

Four different configurations are needed, crossbar configuration levels 401, 402, 403, and 404. Crossbar configuration levels 401, 402, 403 are used for intermediate computations and crossbar configuration level 404 is used to compute the final result. In each of the crossbar configuration levels, two input lanes from local register file 304 are mapped to each lane of output lanes from configurable crossbar 315. This provides each thread with two inputs, one from the thread's assigned lane (input lane 0 maps to output lane 0, etc.) that is not shown in FIG. 4A. The second input is received from a lane that is not assigned to the thread. For example, for crossbar configuration level 401, input lane 1 is mapped to output lane 0 as a second input (input lane 0 is the first input) and input lane 0 is mapped to output lane 1 as a second input (input lane 1 is the first input).

For crossbar configuration level 402, input lanes are grouped in pairs and mapped to output lane groups. For example, input lanes 0 and 1 are mapped to output lanes 2 and 3, respectively, for the second inputs. For crossbar configuration level 403, four input lanes are grouped and mapped to output lane groups. For example, input lanes 0, 1, 2, and 3 are grouped and mapped to output lanes 4, 5, 6, and 7, respectively. For crossbar configuration level 404, eight input lanes are grouped and mapped to output lane groups. For example, input lanes 0, 1, 2, 3, 4, 5, 6, and 7 are mapped to output lanes 8, 9, 10, 11, 12, 13, 14, 15, and 16, respectively. Crossbar controller 320 encodes the crossbar configuration level 401, 402, 403, and 404, for configuring configurable crossbar 315.

Figure 4B:
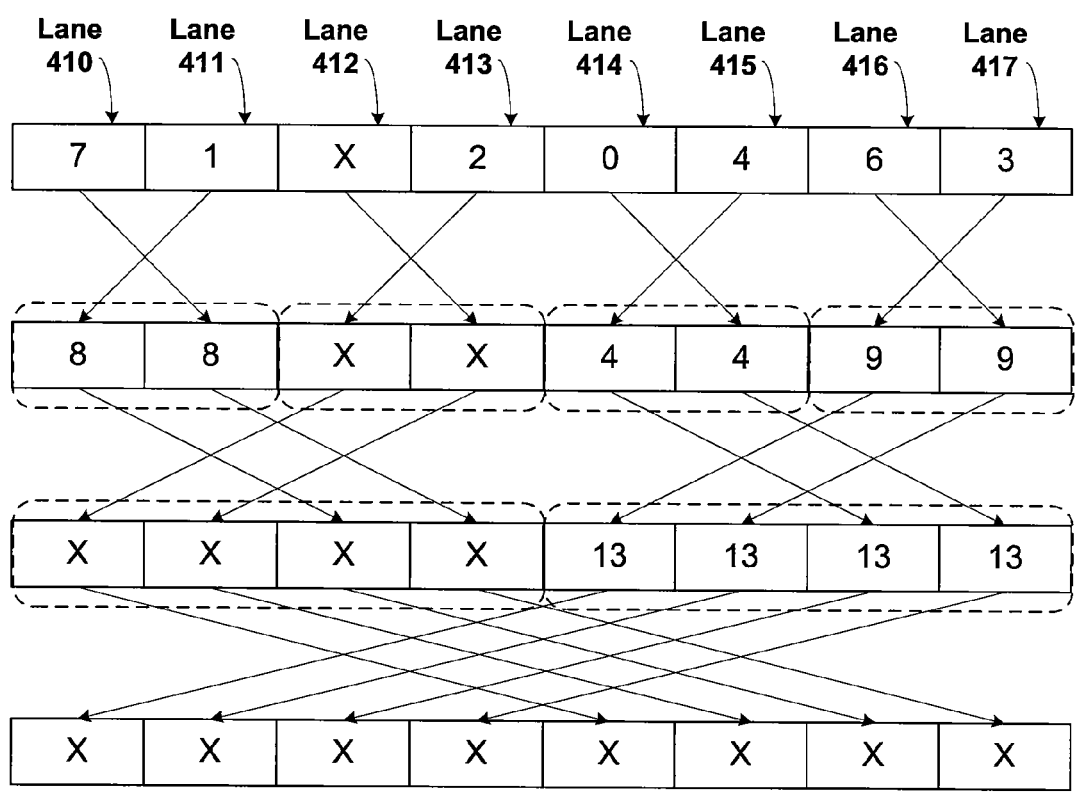
FIG. 4B is a diagram of a sequence of the lane mappings used to perform a reduction operation in accordance with one or more aspects of the present invention.

FIG. 4B is a diagram of a sequence of the lane mappings used to perform a reduction operation for a thread group of eight threads, in accordance with one or more aspects of the present invention. Lane 410 is value 7, lane 411 is value 1, lane 412 is an invalid value since the thread is disabled, lane 413 is value 2, lane 414 is value 4, lane 416 is value 6, and lane 417 is value 3. When a reduction sum operation is performed, the value in each lane (the first input) is summed with the second input that is mapped from another lane by crossbar configuration level 401. The mapping of each lane to itself (to provide the first input) is not explicitly shown in FIG. 4B. Summing with an invalid value produces an invalid results, as shown when the X value is mapped from lane 412 to the second input of lane 413. When the value of 2 in lane 413 is summed with the X value, the result of X is stored in lane 413. This illustrates how an invalid lane value from a disabled thread corrupts the reduction computation for an enabled thread. Additional mapping configurations are used to configure configurable crossbar to avoid such corruptions, as described in conjunction with FIG. 4C.

As shown in FIG. 4B, following the first level of mapping, the contents of lanes 410 and 411 produce a sum of 8 that is stored in lanes 410 and 411 of local register file 304. The contents of lanes 414 and 415 produce a sum of 4 that is stored in lanes 414 and 415 of local register file 304. The contents of lanes 416 and 417 produce a sum of 9 that is stored in lanes 416 and 417 of local register file 304. The lanes are read from local register file 304 to perform the next level of the reduction computation, using the intermediate results.

In the second level of mapping, crossbar controller 320 configures configurable crossbar 315 to map lanes 410 and 411 to lanes 412 and 413, lanes 412 and 413 to lanes 410 and 411, lanes 414 and 415 to lanes 416 and 417, lanes 416 and 417 to lanes 414 and 415, respectively. The inputs for each lane are summed to produce invalid values in lanes 410, 411, 412, and 413, and value 13 in lanes 414, 415, 416, and 417. For the second level of mapping, two input lanes are grouped together (enclosed by dashed boxes in FIG. 4B) to form four lane groupings. The intermediate results are stored in local register file 304 and read for the third and last level of mapping.

In the third level of mapping, crossbar controller 320 configures configurable crossbar 315 to map lanes 410, 411, 412, and 413 to lanes 414, 415, 416, and 417, and lanes 414, 415, 416, and 417 are mapped to lanes 410, 411, 412, and 413, respectively. For the third level of mapping, four input lanes are grouped together (enclosed by dashed boxes in FIG. 4B) to form two lane groupings. The inputs for each lane are summed to produce invalid values in all of the lanes for the SIMT thread group.

Figure 4C:
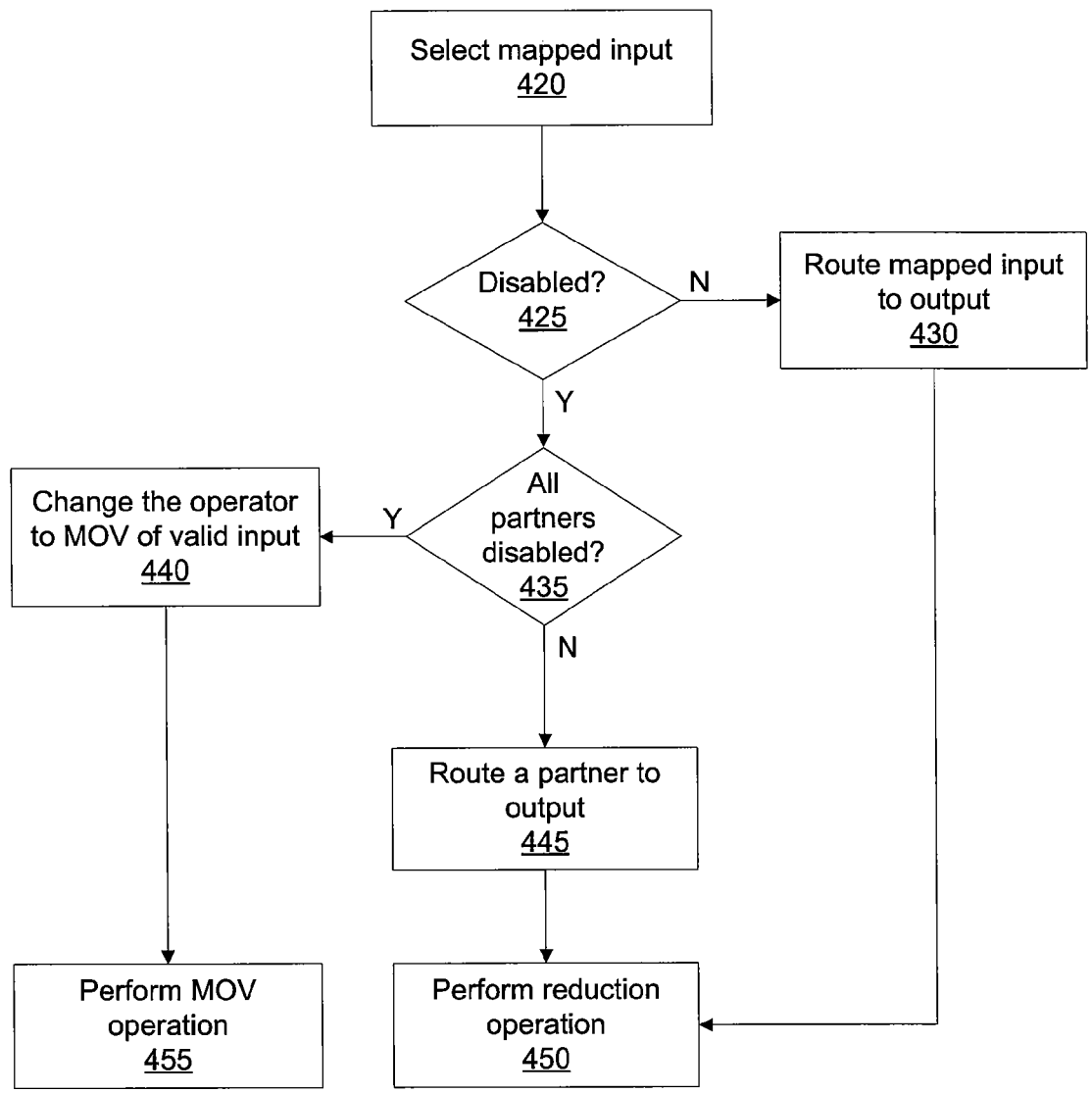
FIG. 4C is a flow diagram of method steps for determining lane mappings to perform a reduction operation in accordance with one or more aspects of the present invention.

FIG. 4C is a flow diagram of method steps for determining lane mappings to perform a reduction operation, in accordance with one or more aspects of the present invention. The steps shown in FIG. 4C are completed for each output lane in a SIMT thread group to determine the second input lane for a reduction operation. In step 420 the second input is selected from the input lanes by crossbar controller 320, according to the level (iteration) of the computation for the reduction instruction. The level is n, where the number of lanes=$2^n$. The number of lanes the lane groupings for each level is also equal to n. In the first level, lane 411 is the selected second input for lane 410. In the second level, lane 412 is the selected second input for lane 410. In the third level, lane 414 is the selected second input for lane 410. More generally, given a lane width of N, a reduction operation requires $\log_2(N)$ levels, where each level n satisfies the constraint $0<n<\log_2(N)$. For any level n and lane i, the lane partners (in a lane grouping) consist of lanes from (i & mask) to ((i & mask)+($2^n$−1)), where mask=~($2^n$−1).

In step 425 crossbar controller 320 determines if the thread corresponding to the selected lane is disabled, according to the active mask for the thread group, and, if not, in step 430 configurable crossbar 315 is configured to map the selected lane to the second input for the output lane. If, in step 425 crossbar controller 320 determines that the thread corresponding to the selected lane is disabled, then in step 435 crossbar controller 320 determines if all partners in the lane grouping are disabled. There are no lane groupings for the first level of mapping. In the second level of mapping, each lane grouping includes two lanes, so there is a partner in each lane grouping. In the third level of mapping, each lane grouping includes four lanes, so there are three partners for each lane in a lane grouping. When the threads corresponding to all of the partners are disabled, all of the lane values in the group are invalid, and in step 440 crossbar controller 320 is configured to convert the operator, e.g., ADD, MIN, MAX, or the like, to a MOV operation to map a valid value to the output lane. In step 455, the MOV operation is completed by configurable crossbar 315.

If, in step 435 crossbar controller 320 determines that all partners in the lane grouping are not disabled, then the selected lane is replaced with any one of the valid values from a partner lane that corresponds to an enabled thread. All of the valid values in the partner lanes are equal, so the selection can be arbitrary. In step 435 crossbar controller 320 configures configurable crossbar 315 to map a partner lane (for an enabled thread) to the second input for the output lane. In step 450 an iteration of the reduction operation is performed by processing engines 302 or reduction operation unit 325. The method shown in FIG. 4C is repeated for each lane and iteration of the reduction operation to produce the result. Crossbar controller 320 may be configured to perform the method for multiple lanes in parallel in order to perform an interation for all of the thread in a SIMT thread group in parallel.

Figure 4D:
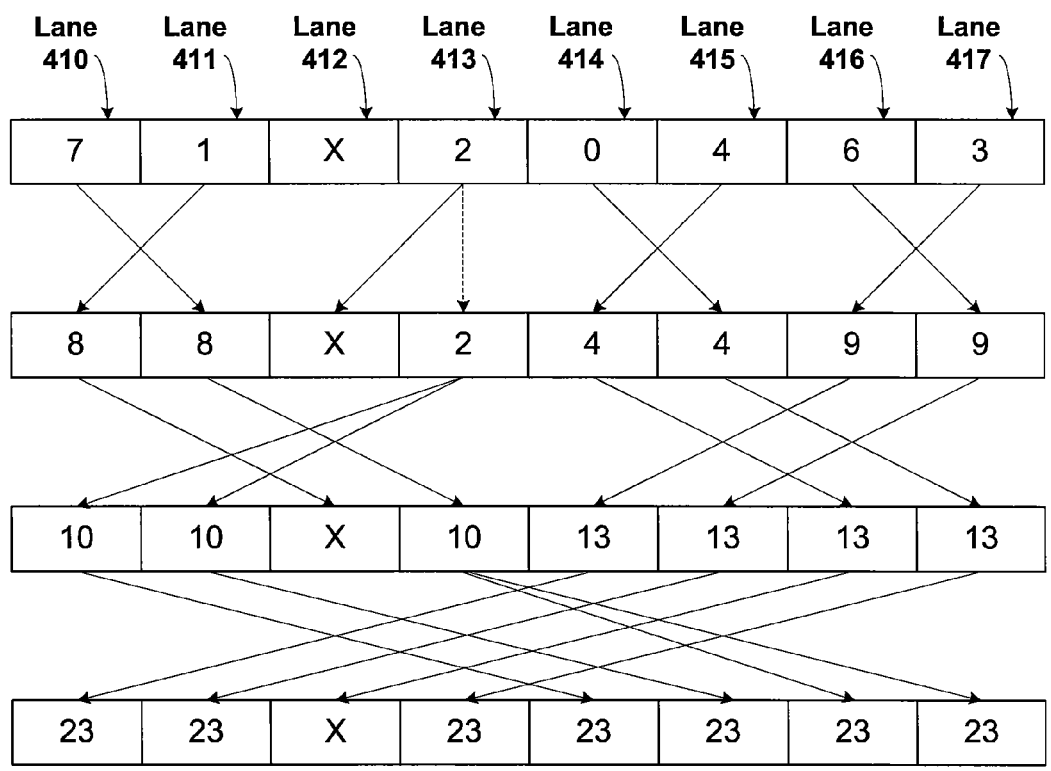
FIG. 4D is a diagram of a sequence of lane mappings used to perform a reduction operation with a disabled thread in accordance with one or more aspects of the present invention.

FIG. 4D is a diagram of a sequence of lane mappings used to perform a reduction operation with a disabled thread, in accordance with one or more aspects of the present invention. In this example, the initial lane values are the same as shown in FIG. 4B. However, the method of mapping the lanes as described in FIG. 4C is used so that invalid values for disabled threads do not corrupt the lane values for enabled threads in the same SIMT thread group.

When the value of 1 mapped from lane 411 as the second input to lane 410 is summed with 7, the result of 8 is stored in lane 410. Similarly, when the value of 7 mapped from lane 410 as the second input to lane 411 is summed with 1, the result of 8 is stored in lane 411. Rather than selecting the X is the lane mapped as the second input to lane 413, the sum operator is replaced with a move operator (MOV) to map lane 413 to itself (there are no partners in the lane grouping for the first iteration). The MOV operation represented as a dotted line in FIG. 4D. This illustrates how an invalid lane value from a disabled thread is prevented from corrupting the reduction computation for an enabled thread. Since the thread corresponding to lane 412 is disabled, the value stored in lane 412 is not critical and remains unmodified.

As shown in FIG. 4D, following the first level of mapping, the contents of lanes 414 and 415 produce a sum of 4 that is stored in lanes 414 and 415 of local register file 304. The contents of lanes 416 and 417 produce a sum of 9 that is stored in lanes 416 and 417 of local register file 304. The lanes are read from local register file 304 to perform the next level of the reduction computation, using the intermediate results.

In the second level of mapping, crossbar controller 320 configures configurable crossbar 315 to map lanes 410 and 411 to lanes 412 and 413, lanes 414 and 415 to lanes 416 and 417, lanes 416 and 417 to lanes 414 and 415, respectively. Since the value in lane 412 is invalid and lane partner (lane 413) is valid, crossbar controller 320 configures configurable crossbar 315 to map lane 413 to lanes 410 and 411 instead of mapping lane 412 to lane 410. The inputs for each lane are summed to produce value 10 in lanes 410, 411, and 413, and value 13 in lanes 414, 415, 416, and 417. The intermediate results are stored in local register file 304 and read for the third and last level of mapping.

In the third level of mapping, crossbar controller 320 configures configurable crossbar 315 to map lanes 410, 411, and 413 to lanes 414, 415, and 417, and lanes 414, 415, 416, and 417 are mapped to lanes 410, 411, 412, and 413, respectively. Since the value in lane 412 is invalid and lane partners (lanes 410, 411, and 413) are valid, crossbar controller 320 configures configurable crossbar 315 to map lane 413 to lane 416 instead of mapping lane 412 to lane 416. The inputs for each lane are summed to correctly produce value 23 in all of the lanes corresponding to enabled threads in the SIMT thread group. Other reduction operations, such as minimum, maximum, and the like, may be performed using the method of lane mapping shown in FIG. 4C.

Figure 5A:
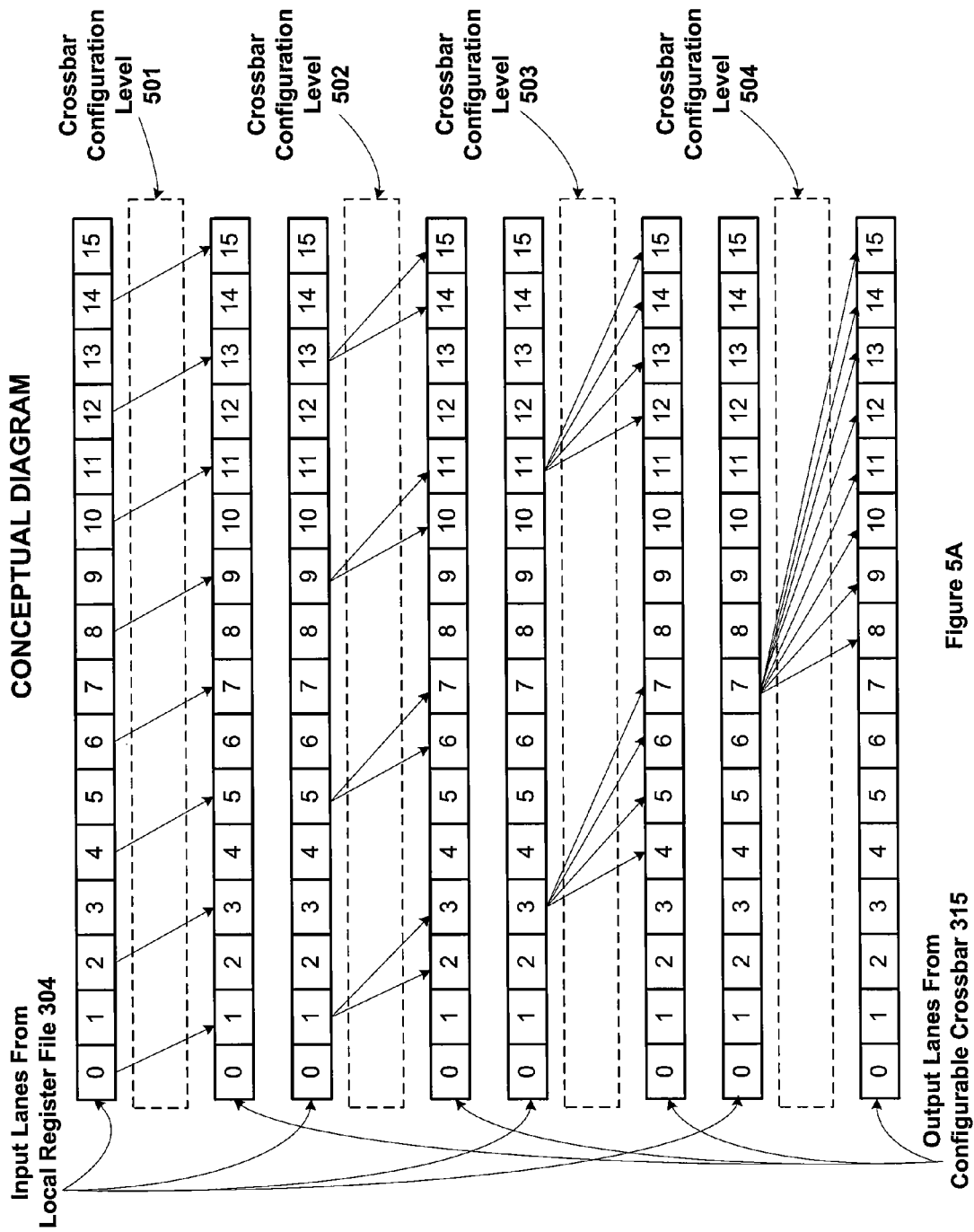
FIG. 5A is a conceptual diagram of a sequence of crossbar configurations used to perform a prefix reduction operation in accordance with one or more aspects of the present invention.

FIG. 5A is a conceptual diagram of a sequence of crossbar configurations used to perform a prefix reduction operation, in accordance with one or more aspects of the present invention. A prefix reduction operation is a directional operation, such as sum to the left or right, max to the left or right, min to the left or right, and the like. The sequence shown in FIG. 5A configures crossbar unit 310 to perform an order dependent reduction operation for 16 lanes, i.e., for a thread group with 16 SIMD threads. When one or more threads are disabled, according to the active mask, additional mappings are needed, as described in conjunction with FIGS. 5B, 5C, 5D, and 5E.

Four different configurations are needed, crossbar configuration levels 501, 502, 503, and 504. Crossbar configuration levels 501, 502, 503 are used for intermediate computations and crossbar configuration level 504 is used to compute the final result. Each thread is provided with an input from the thread's assigned lane (input lane 0 maps to output lane 0, etc.) that is not shown in FIG. 5A. A second input is received by only half of the lanes and is received from a lane that is not assigned to the thread. For example, for crossbar configuration level 501, input lane 0 is mapped to output lane 1 as a second input (input lane 1 is the first input) and output lane 0 only receives lane 0 as an input.

For crossbar configuration level 502, lane groupings include two input lanes and one of every four lanes is mapped as a second input to two output lanes. For example, input lane 1 is mapped to output lanes 2 and 3 as the second inputs. For crossbar configuration level 503, lane groupings include four input lanes and one of every eight lanes is mapped as a second input to four output lanes. For example, input lane 3 is mapped to output lanes 4, 5, 6, and 7. For crossbar configuration level 504, lane groupings include eight input lanes, and one of every sixteen lanes is mapped as a second input to eight output lanes. For example, input lane 7 is mapped to output lanes 8, 9, 10, 11, 12, 13, 14, 15, and 16. Crossbar controller 320 encodes the crossbar configuration level 501, 502, 503, and 504, for configuring configurable crossbar 315.

Figure 5B:
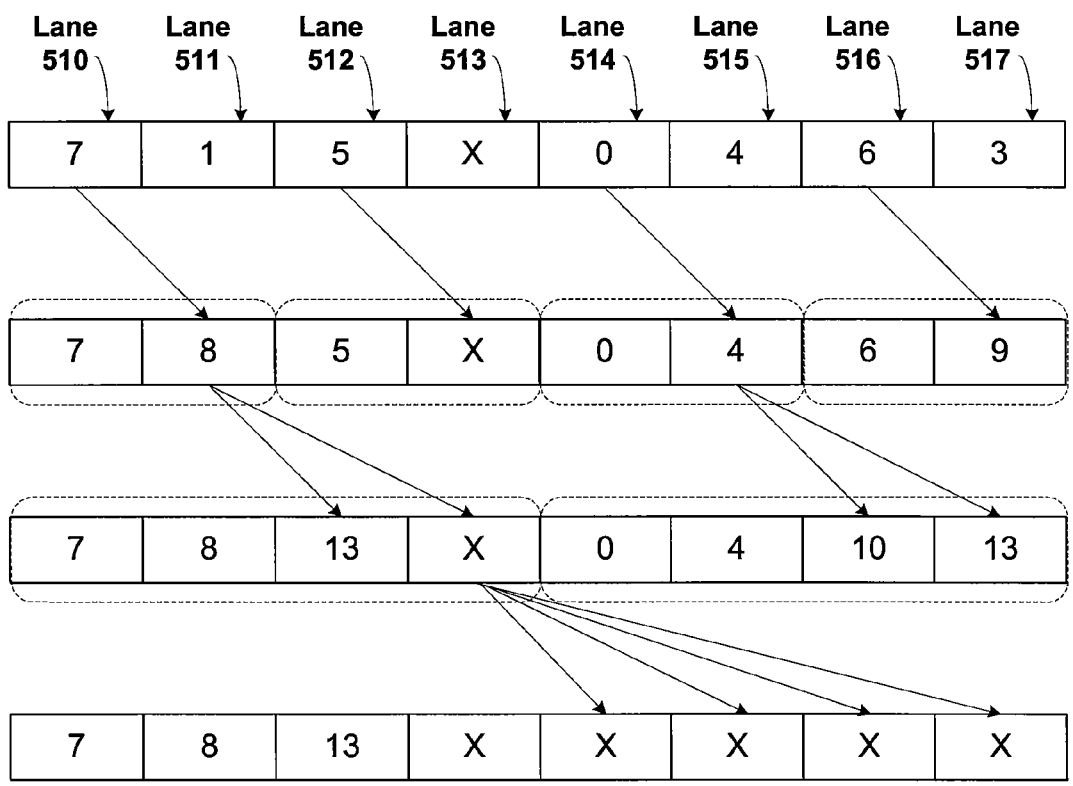
FIG. 5B is a diagram of a sequence of lane mappings used to perform a prefix reduction operation in accordance with one or more aspects of the present invention.

FIG. 5B is a diagram of a sequence of lane mappings used to perform a prefix reduction operation, in accordance with one or more aspects of the present invention. Lane 510 is value 7, lane 511 is value 1, lane 512 is value 5, lane 513 is an invalid value since the thread is disabled, lane 514 is value 4, lane 516 is value 6, and lane 517 is value 3. When a prefix reduction right sum operation is performed, the first value in each lane with two inputs is summed with the second input that is mapped from another lane by crossbar configuration level 501. The second input provides a partial sum of the lanes to the left. The mapping of each lane to itself is not explicitly shown in FIG. 5B. Summing with an invalid value produces an invalid result, as shown when the X value in lane 513 is summed with the second input mapped from lane 512. When the value of 5 in lane 512 is summed with the X value, the result of X is stored in lane 513. This illustrates how an invalid lane value from a disabled thread corrupts the prefix reduction computation for an enabled thread. Additional mapping configurations are used to configure configurable crossbar to avoid such corruptions, as described in conjunction with FIG. 5C.

As shown in FIG. 5B, following the first level of mapping, the contents of lanes 510 and 511 produce a sum of 8 that is stored in lane 411 of local register file 304. The contents of lanes 514 and 515 produce a sum of 4 that is stored in lane 415 of local register file 304. The contents of lanes 416 and 417 produce a sum of 9 that is stored in lane 417 of local register file 304. The lanes are read from local register file 304 to perform the next level of the prefix reduction computation, using the intermediate results.

In the second level of mapping, crossbar controller 320 configures configurable crossbar 315 to map lane 511 to lanes 512 and 513 and lane 515 to lanes 516 and 517. The inputs for lanes 512, 513, 516, and 517 are summed to produce values 13, 10, and 13 in lanes 512, 516, and 517. The invalid value of X remains in lane 513. The intermediate results are stored in local register file 304 and read for the third and last level of mapping. In the third level of mapping, crossbar controller 320 configures configurable crossbar 315 to map lane 513 to lanes 514, 515, 516, and 517. The inputs for lanes 514, 515, 516, and 517 are summed to produce invalid values in those lanes.

Figure 5C:
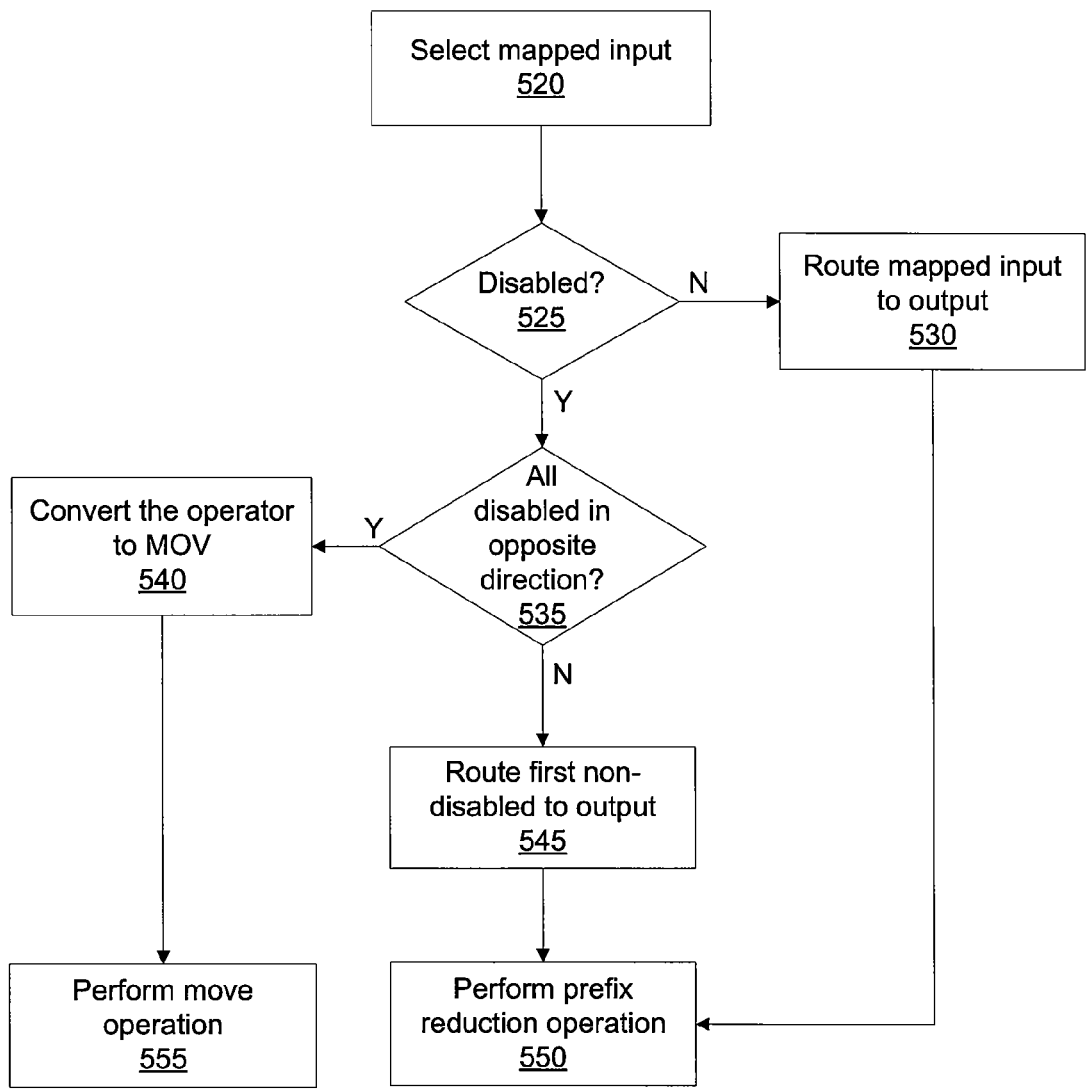
FIG. 5C is a flow diagram of method steps for determining lane mappings to perform a prefix reduction operation in accordance with one or more aspects of the present invention.

FIG. 5C is a flow diagram of method steps for determining lane mappings to perform a prefix reduction operation, in accordance with one or more aspects of the present invention. The steps shown in FIG. 5C are completed for half of the output lanes in a SIMT thread group, to determine the second input lane for a reduction operation. In step 520 the second input is selected from the input lanes by crossbar controller 320 according to the level (iteration) of the computation for the prefix reduction instruction.

In step 525 crossbar controller 320 determines if the thread corresponding to the selected lane is disabled according to the active mask for the thread group, and, if not, in step 530 configurable crossbar 315 is configured to map the selected input lane to the second input for the output lane. If, in step 525 crossbar controller 320 determines that the thread corresponding to the selected lane is disabled, then in step 535 crossbar controller 320 determines if all lanes (starting from the selected input lane) in the opposite direction of the prefix reduction operation correspond to threads that are disabled. For example, in the third level of mapping, lane 513 is the selected second input lane for output lanes 514, 515, 516, and 517. When lane 513 stores an invalid value, crossbar controller 320 determines if all of the lanes to the left of lane 513 (enclosed in a dashed box) are invalid, i.e., correspond to disabled threads. When the threads corresponding to all of lanes in the opposite direction are disabled, all of those lane values are invalid, and in step 540 crossbar controller 320 converts the operator to a move operator (MOV) and in step 555, configurable crossbar 315 is configured to map a valid value to the output lane to perform the MOV operation.

If, in step 535 crossbar controller 320 determines that all lanes in the opposite direction are not disabled, then in step 545 the selected lane is replaced with the first valid value from a lane in the opposite direction. The first valid value should be used since prefix reduction operations are order dependent. In step 545 crossbar controller 320 configures configurable crossbar 315 to map the first lane in the opposite direction of the selected second lane that corresponds to an enabled thread, to the output lane. In step 550 an iteration of the prefix reduction operation is performed by processing engines 302 or reduction operation unit 325. The method shown in FIG. 5C is repeated for each output lane with a second input lane and for each iteration of the prefix reduction operation to produce the result. Crossbar controller 320 may be configured to perform the method for multiple lanes in parallel in order to perform an iteration for all of the threads in a SIMT thread group in parallel.

Figure 5D:
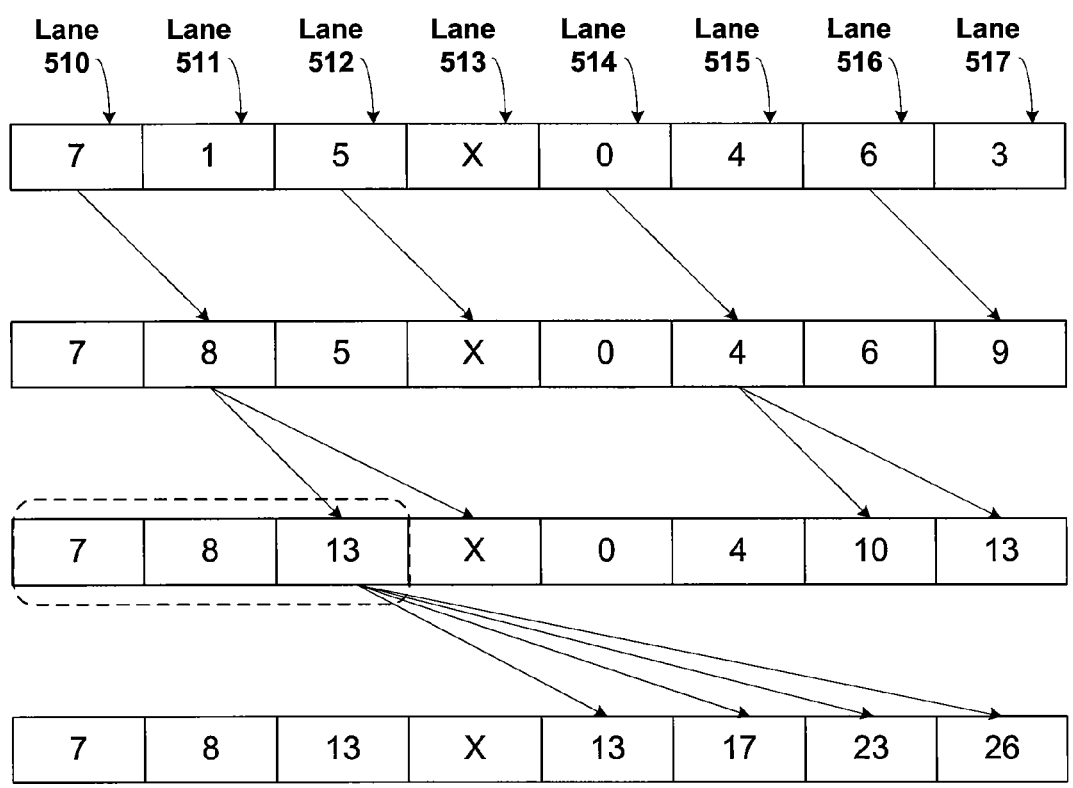
FIG. 5D is a diagram of a sequence of lane mappings used to perform a prefix reduction operation with a disabled thread in accordance with one or more aspects of the present invention.

FIG. 5D is a diagram of a sequence of lane mappings used to perform a prefix reduction operation with a disabled thread, in accordance with one or more aspects of the present invention. In this example, the initial lane values are the same as shown in FIG. 5B. However, the method of mapping the lanes, as described in FIG. 5C, is used so that invalid values for disabled threads do not corrupt the lane values for enabled threads in the same SIMT thread group.

When the X value in lane 513 is selected as the lane mapped as the second input to lanes 514, 515, 516, and 517 for the third mapping level, crossbar controller 320 determines that lane 513 should not provide the second input. Crossbar controller 320 configures configurable crossbar 315 to map the first valid lane value to the left of lane 513 to lanes 514, 515, 516, and 517. Therefore, the value 13 from lane 512 is mapped as the second input to lanes 514, 515, 516, and 517. This illustrates how an invalid lane value from a disabled thread is prevented from corrupting the reduction computation for enabled threads. The inputs for lanes 514, 515, 516, and 517 are summed to correctly produce the values 13, 17, 23, and 26 in lanes 514, 515, 516, and 517. All of the lanes corresponding to enabled threads in the SIMT thread group store correct results for a prefix reduction of sum to right at the end of the computation.

Figure 5E:
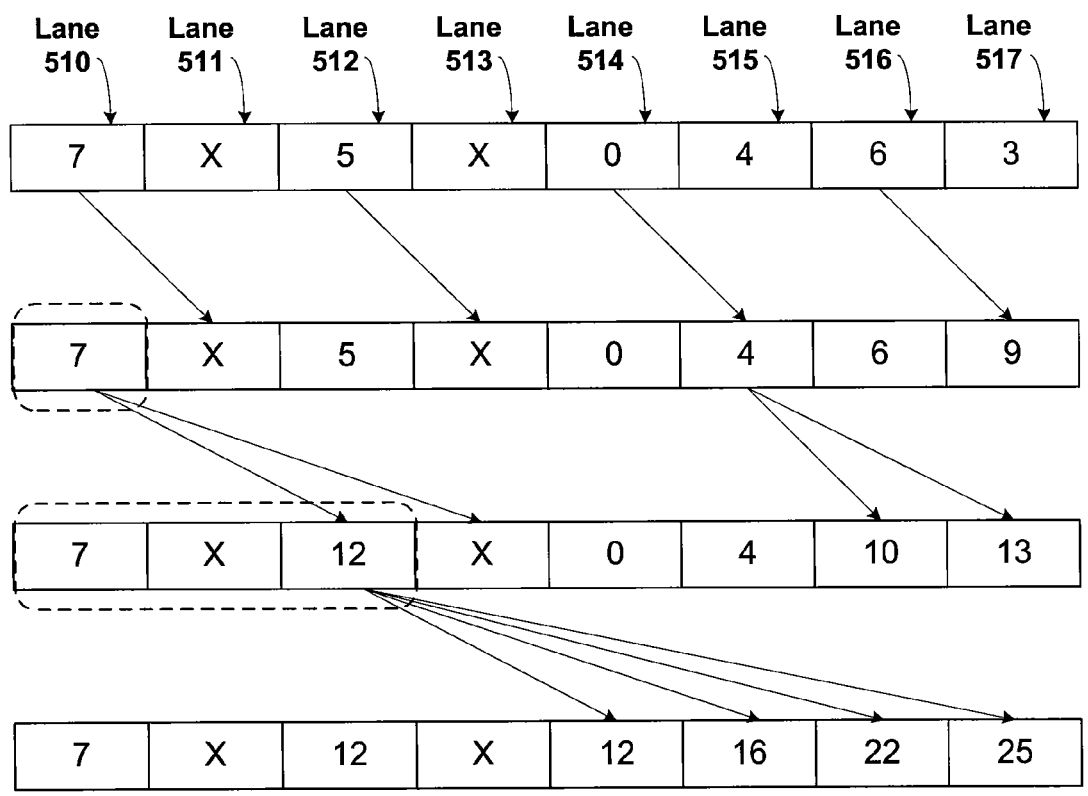
FIG. 5E is a diagram of another sequence of lane mappings used to perform a prefix reduction operation with a disabled thread in accordance with one or more aspects of the present invention.

FIG. 5E is a diagram of another sequence of lane mappings used to perform a prefix reduction operation with a disabled thread, in accordance with one or more aspects of the present invention. In this example, the thread corresponding to lane 511 is disabled. The method of mapping the lanes, as described in FIG. 5C, is used so that invalid values for disabled threads do not corrupt the lane values for enabled threads in the same SIMT thread group.

When the X value in lane 511 is selected as the lane mapped as the second input to lanes 512 and 513 for the second mapping level, crossbar controller 320 determines that lane 511 should not provide the second input. Crossbar controller 320 configures configurable crossbar 315 to map the first valid lane value to the left of lane 511 to lanes 512 and 513. Therefore, the value 7 from lane 510 is mapped as the second input to lanes 512 and 513. This illustrates how an invalid lane value from a disabled thread is prevented from corrupting the reduction computation for enabled threads. Note that if the value in lane 510 were invalid, crossbar controller 320 would configure configurable crossbar 315 to perform a move operation for lanes 512 and 513. The inputs for lane 512 are summed to correctly produce the value 12 in that lane (since lane 513 is disabled, no sum is performed). All of the lanes corresponding to enabled threads in the SIMT thread group store correct results for a prefix reduction of sum to the right at the end of the computation.

The present invention provides a system and method for successfully performing reduction operations in a multi-threaded SIMD system while one or more threads are disabled. The reduction operations may be performed without a degradation in performance compared with executing the same operation with all of the threads enabled. The inputs for each intermediate computation of the reduction operation are remapped as needed to avoid using invalid data from the disabled threads. The remapping function is transparent to the user and enables correct execution of order invariant reduction operations and order dependent prefix-reduction operations.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read-only memory (CD-ROM) disks readable by a CD-ROM drive, flash memory, read-only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

The invention claimed is:

1. A method for performing a reduction operation in a multi-threaded computing device, the method comprising:
    receiving an active mask for a single-instruction, multiple data (SIMD) thread group;
    mapping an input lane value of a first thread to a first output lane value of the first thread to provide a first input for the reduction operation;
    determining that the active mask indicates that execution of a second thread is disabled;
    mapping, based on the active mask and the reduction operation, an input lane value of an active thread in the SIMD thread group as a second output lane value for the first thread to replace an invalid value of the second thread with a valid value and to provide a second input for the reduction operation; and
    converting the reduction operation into a move operation to map the valid value as the second output lane value for the first thread when the input lane value for an active thread is not available.

2. The method of claim 1, further comprising the step of performing an iteration of the reduction operation to produce an intermediate result.

3. The method of claim 2, further comprising the step of selecting the active thread in the SIMD thread group based on the iteration and the active mask.

4. The method of claim 2, wherein the active thread in the SIMD thread group is in a lane grouping that also includes the first thread, and a number of threads in the lane grouping is based on the iteration.

5. The method of claim 2, further comprising repeating the steps of mapping the input lane value of the first thread, determining, mapping the input lane value of the active thread, converting, and performing to produce a correct result of the reduction operation for the SIMD thread group.

6. The method of claim 1, wherein the reduction operation is a prefix-reduction operation that is order dependent.

7. The method of claim 6, wherein the active thread in the SIMD thread group is a thread nearest to the first thread in an opposing direction compared with a direction specified by the prefix-reduction operation.

8. The method of claim 6, wherein the prefix-reduction operation is a sum to left computation.

9. The method of claim 6, wherein the prefix-reduction operation is a sum to right computation.

10. The method of claim 1, wherein the reduction operation is an order invariant sum computation.

11. The method of claim 1, wherein the reduction operation is an order invariant minimum computation.

12. The method of claim 1, wherein the reduction operation is an order invariant maximum operation.

13. A multi-threaded computing device configured to execute reduction instructions, the multi-threaded computing device comprising:
 a crossbar controller that is configured to:
  receive an active mask for a single-instruction, multiple data (SIMD) thread group;
  map an input lane value of a first thread to a first output lane value of the first thread to provide a first input for the reduction operation;
  determine that the active mask indicates that execution of a second thread is disabled;
  map, based on the active mask and the reduction operation, an input lane value of an active thread in the SIMD thread group as a second output lane value for the first thread to replace an invalid value of the second thread with a valid value and to provide a second input for the reduction operation; and
  convert the reduction operation into a move operation to map the valid value as the second output lane value for the first thread when the input lane value for an active thread is not available; and
 a configurable crossbar coupled to the crossbar controller and configured to route said input lane values to said output lane values for the SIMD thread group according to mappings provided by the crossbar controller.

14. The multi-threaded computing device of claim 13, further comprising a reduction operation unit coupled to the configurable crossbar and configured to perform an iteration of the reduction operation to produce an intermediate result.

15. The multi-threaded computing device of claim 14, wherein the crossbar controller is further configured to select the active thread in the SIMD thread group based on the iteration and the active mask.

16. The multi-threaded computing device of claim 14, wherein the active thread in the SIMD thread group is in a lane grouping that also includes the first thread, and a number of threads in the lane grouping is based on the iteration.

17. The multi-threaded computing device of claim 14, wherein the intermediate result is used as the input lane values, and crossbar controller is further configured to determine the mappings of said input lane values to said output lane values to produce a correct result of the reduction operation for the SIMD thread group based on the iteration and the active mask.

18. The multi-threaded computing device of claim 13, wherein the reduction operation is a prefix-reduction operation that is order dependent.

19. The multi-threaded computing device of claim 18, wherein the crossbar controller is further configured to determine that the active thread in the SIMD thread group is a thread nearest to the first thread in an opposing direction compared with a direction specified by the prefix-reduction operation.

20. The multi-threaded computing device of claim 13, wherein the reduction operation is an order invariant operation.

* * * * *

UNITED STATES PATENT AND TRADEMARK OFFICE
CERTIFICATE OF CORRECTION

PATENT NO.        : 8,200,940 B1
APPLICATION NO.   : 12/164492
DATED             : June 12, 2012
INVENTOR(S)       : John Erik Lindholm It is certified that error appears in the above-identified patent and that said Letters Patent is hereby corrected as shown below:

Column 17 Claim 13, line 24 delete "to".

Signed and Sealed this
Eighteenth Day of September, 2012

David J. Kappos
*Director of the United States Patent and Trademark Office*